May 20, 1924.

H. O. HAGUE 1,494,904

SAUSAGE COOKER, WASHER, AND DRIER

Filed Jan. 18, 1923     5 Sheets-Sheet 1

Fig.1

Inventor.
Harold O. Hague
By: [signature]
Atty

May 20, 1924.

H. O. HAGUE

SAUSAGE COOKER, WASHER, AND DRIER

Filed Jan. 18, 1923

Inventor.
Harold O. Hague

May 20, 1924.

H. O. HAGUE

SAUSAGE COOKER, WASHER, AND DRIER

Filed Jan. 18, 1923   5 Sheets-Sheet 5

Inventor.
Harold O. Hague.
By May H. Label Atty

Patented May 20, 1924.

1,494,904

UNITED STATES PATENT OFFICE.

HAROLD O. HAGUE, OF CHICAGO, ILLINOIS, ASSIGNOR TO PACKERS MACHINERY & EQUIPMENT CO., OF CHICAGO, ILLINOIS, A CORPORATION OF ILLINOIS.

SAUSAGE COOKER, WASHER, AND DRIER.

Application filed January 18, 1923. Serial No. 613,412.

*To all whom it may concern:*

Be it known that I, HAROLD O. HAGUE, a citizen of the United States, residing at Chicago, in the county of Cook and State of Illinois, have invented a certain new and useful Improvement in Sausage Cookers, Washers, and Driers, of which the following is a full, clear, concise, and exact description, reference being had to the accompanying drawings, forming a part of this specification.

My invention relates to sausage cookers, washers and driers, and more particularly to a device wherein the cooking, washing and drying is carried on as a continuous operation.

It is a purpose of the invention to provide a device of the above mentioned character which is adapted to receive the sausages carried by the smoking sticks at one end thereof, carry said sticks with the sausages thereon through a vat of hot water for a predetermined interval under a spray of cooling water and then to a point from which they can be readily removed from the device and taken to the cooler.

It is a further purpose of the invention to provide a device of the above mentioned character in which the sausages are subjected to a spray of hot water after having been cooled to restore the smooth appearance of the casing and recondition the sausages. Said spray is only sufficient to affect the casing and does not again heat up the sausages to any appreciable degree.

It is another purpose of the invention to provide a device of the above mentioned character comprising a continuous conveyor for carrying the sausages through the vat of hot water and under the sprays of cold and hot water and to the point of discharge of the sausages from the machine, said conveyor being variable in speed so that the length of time of cooking of the sausages in the vat of hot water can be regulated in accordance with the kind and size of sausages that is being operated on by the machine.

It is a further purpose of the invention to provide means for preventing the rising of the sausages toward the surface of the boiling water in the vat or the floating of the sausages from the smoke house sticks, or the floating of the smoke house sticks off the conveyor due to the action of the water in the boiling vat. Preferably the means for preventing the sausages from leaving the smoke house sticks or the conveyor, comprise a conveyor operating above the conveyor carrying said smoke house sticks having the sausages thereon, which is made up of members in the forms of strips that are adapted to engage with the sausages to hold them in position on the sticks and below the surface of the hot water.

It is still a further purpose of the invention to provide a new and improved process for treating sausages after leaving the smoke house comprising cooking the same, cooling said sausages, spraying the same with hot water to smooth out the casing thereof, and drying said sausages after leaving said last mentioned spray.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

Figure 1:
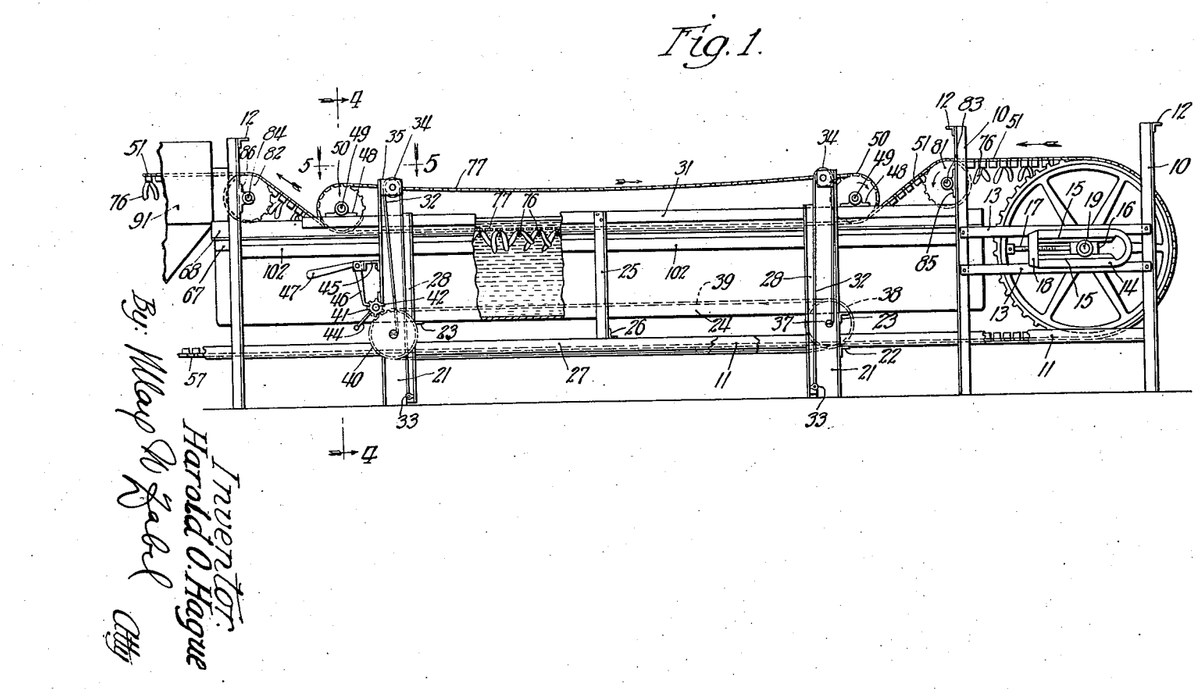
Fig. 1 is a side elevation of approximately one-half of my improved machine.
Figure 2:
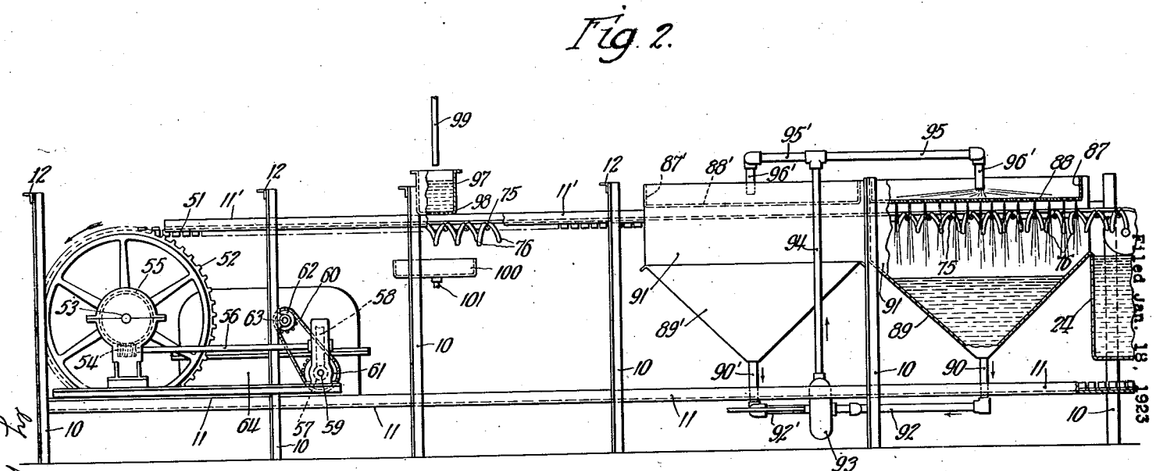
Fig. 2 is a similar view of the other half thereof.
Figure 3:
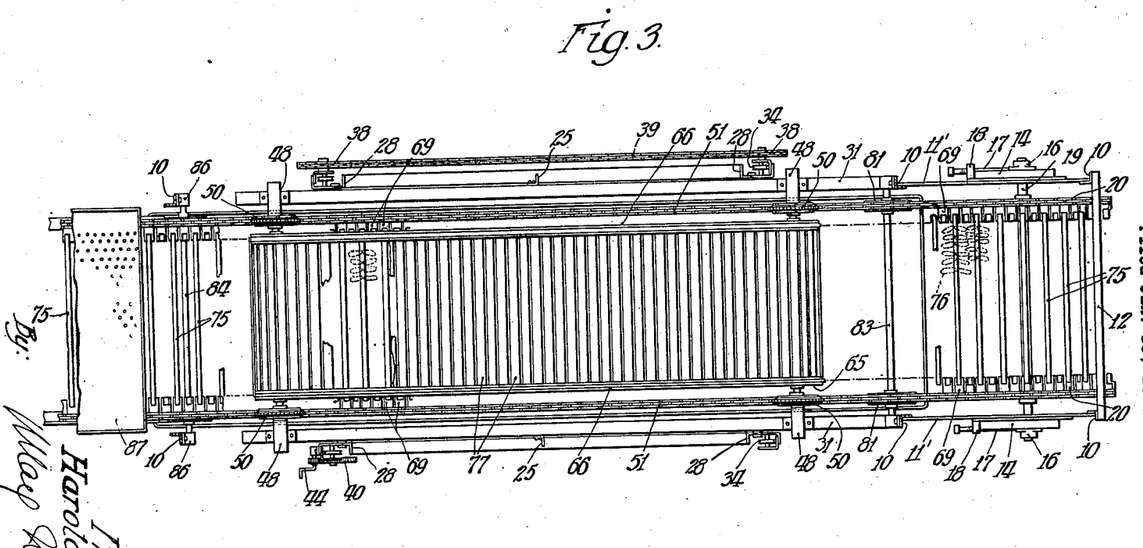
Fig. 3 is a fragmentary plan view of the right hand end portion of the machine shown in Fig. 1.

Referring in detail to the drawings, in Figs. 1 and 2 is shown a framework comprising the vertically extending members 10 and the longitudinally extending members 11 and 11' and the transverse members 12. The vertically extending members 10 in the right hand end portion of Fig. 1 are shown as being connected by means of a pair of longitudinally extending members 13 carrying the yoke 14 having guide members 15 therein for slidably receiving a block 16 with which a screw 17 engages that has screwthreaded engagement with the end member 18 of said yoke. The block 16 carries a shaft 19 upon which the sprocket wheels 20 are mounted. It will thus be seen that the sprocket wheels 20 are mounted for adjustment longitudinally of the device by moving the block 16 in the guideway 15 by means of the screw 17. The longitudinally extending members 11 on each side of the machine between the second upright 10 from the right hand end of the machine and the next upright 10 are secured to uprights or vertically extending members 21 by means of the transverse members 22. Said members 21 also carry transverse members 23 upon which the tank 24 rests. A vertically extending member or upright 25 is also provided on each side of the device between the members 21, said member 25 being secured to a transverse member 26, which is carried by the longitudinally extending members 27 which tie together the vertically extending members 28, which vertically extending members 28 are movable vertically relative to the members 21. The members 28 are guided in their movements by means of the guide plates 29 and 30 secured to the members 21 and carry the longitudinally extending members 31 which tie together the members 28 at the upper end thereof and which also have secured thereto the members 25, and the transverse beams 103. The members 10 at each end of the tank 10 are also connected by the longitudinally extending members 102.

Figure 5:
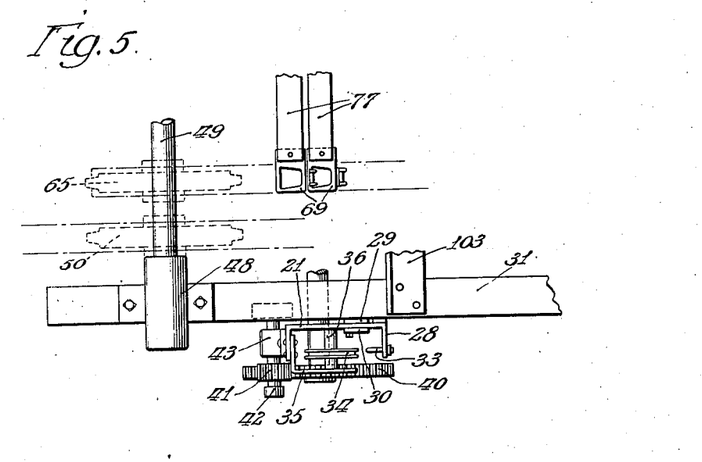
Fig. 5 is a section taken on the line 5—5 of Fig. 1.

It will thus be seen that a stationary tank 24 is provided and a framework vertically movable relative to said tank is provided adjacent the same. Said framework may be moved up and down by means of a flexible member 32 at each end thereof secured to the members 28 by means of the eyes 33 and operating over the pulleys 34 provided on the brackets 35 on the members 21, said brackets being clearly shown in Fig. 5. The pulleys 34 are mounted on shafts 36 extending between said brackets 35 and the members 21. From the pulleys the flexible members 32 extend to the winding shafts 37 to which the ends of said flexible members 32 are secured, said shafts 37 being provided with sprockets 38 over which the sprocket chain 39 extends. Provided on one of said shafts 37 is a gear 40 with which the pinion 41 meshes, said pinion 41 being provided on the shaft 42 mounted in a bearing 43 on one of said members 21 and being provided with a crank or handle 44 for rotating the same. Pivotally mounted on a bracket 45 is a pawl 46 having a handle 47 for operating the same, said pawl engaging with the teeth on the pinion 104 on shaft 42 to prevent rotation thereof when it is desired to hold the vertically movable framework stationary. The members 31 are provided with bearings 48 carrying the shafts 49 upon which are mounted the sprockets 50 with which the conveyor chains 51 operating over the sprockets 20, engage. Said conveyor chains 51 also pass over the sprockets 52 provided on the shaft 53 which is driven by means of the worm gear 54 engaging with the worm wheel 55 on said shaft 53, which worm wheel 54 is mounted on a shaft 56 which in turn is driven by a worm gear 57 meshing with the worm wheel 58 on said shaft 56, said worm gear 57 being mounted on the shaft 59 which is driven by means of a roller chain 60 passing over the sprocket 61 on the shaft 59 and over the sprocket 62 on the shaft 63 extending from the variable speed changing mechanism 64 which is driven from a motor of any suitable type. The details of the variable speed changing mechanism are not shown as this is a well known standard construction. By providing the speed changing mechanism the rate of travel of the conveyor chains 51 can be varied so as to vary the length of time that the sausages are subjected to the various operations in the machine.

Figure 6:
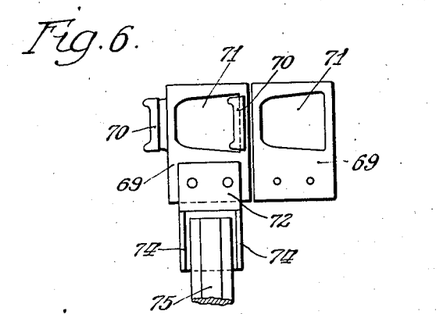
Fig. 6 is a detail plan view of a pair of the conveyor chain links for carrying the smoke house sticks, portions thereof being broken away.
Figure 7:
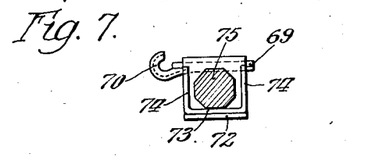
Fig. 7 is a transverse sectional view of a smoke house stick showing the portion of one of said conveyor chain links cooperating with said stick in side elevation.

The shafts 49 are also provided with sprockets 65 which rotate with said shafts. It will accordingly be seen that as the sprockets 50 rotate they drive the shafts 49 and the sprockets 65 at the same rate of rotation as that of said sprockets 50. Accordingly the conveyor side chains 66 operating over said sprockets 65 will travel at the same speed as the chains 51, the sprockets 50 and 65 being of the same size. The tank 24 is provided with a pair of angle members 67 and 68, the angle member 67 being secured to the sides of the tank and the angle members 68 being secured to the members 67, thus said members 67 and 68 form guideways for the conveyor chains 51. Said conveyor chains 51 comprise links 69 as shown in Figs. 6 and 7 which have hook-like portions 70 engaging in the openings 71 of adjacent links, each of said links 69 comprising a flat plate-like portion to one side of the opening 71 to which is riveted a bracket 72 having a channeled or U-shaped member 73 provided with flanges 74 secured thereto, said U-shaped member 73 forming a socket for the reception of the smoking sticks 75.

Figure 4:
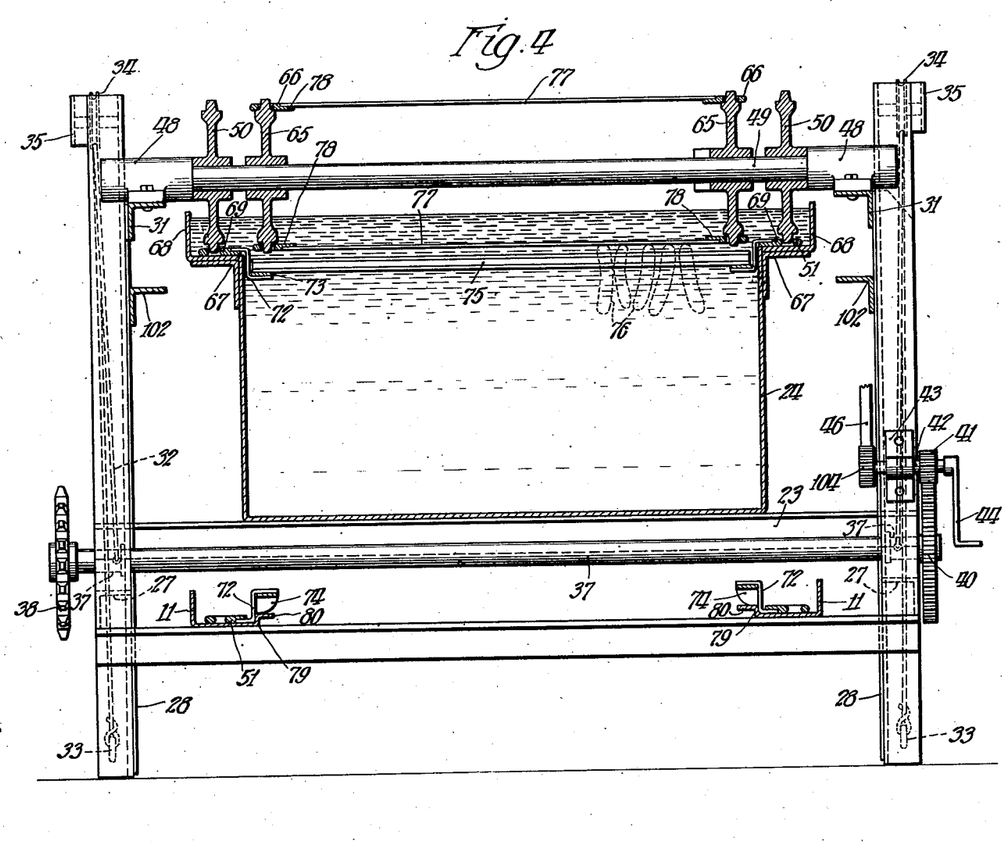
Fig. 4 is an enlarged transverse sectional view thereof taken on the line 4—4 of Fig. 1.

As will be seen from Fig. 4 said sticks 75 extend from one bracket 72 to the opposite bracket 72 and are adapted to have the sausages 76 draped over the same in the usual manner. Normally said sticks 75 with the sausages 76 thereon will rest in the sockets provided for the same and will remain in position therein due to the action of gravity. However, as such sticks are made of buoyant material and as the sausages themselves will float it has been found very difficult to maintain said sausages and smoke house sticks in position on a conveyor when passing through the water in the tank 24. It has been found that ordinarily not only would the sticks leave the sockets and float but the sausages would float off the sticks, which of course would make it impossible to operate the device continuously and automatically as is desired. In order to overcome this difficulty it has been found necessary to provide means for preventing the sticks and the sausages from leaving their normal position when in the water in the tank 24. For this purpose the strips or slats 77 are mounted on the extensions 78 provided on the links 66, said members 77 having smooth faces for engagement with the sausages 76 and the sticks 75 to prevent damage thereto.

As will be clear from Figs. 1 and 4 the sprockets 50 and 65 extend downwardly into the water in the tank 24 a sufficient distance so that the sausages 76 will be properly cooked therein. As the members 77 will hold the sausages down against the sticks 75, the sausages will always remain in proper position on the sticks and at a proper depth in the hot water. As the conveyor comprising the members 77 travels at the same linear speed as the conveyor comprising the chains 51 and carrying the smoke house sticks 75, there can be no damage done to the sausages due to engagement of the members 77 therewith.

It will be noted from Fig. 4 that the brackets 72 pass around the upper corners of the tank at the side edges thereof, thus providing a guide for the conveyor chain to prevent undue lateral play thereof. The members 11 form guide members for the conveyor chains 51 on the return runs thereof and said members 11 are provided with offsets 79 and lateral wings 80 for engagement by the brackets 72 and the flanges 74 to guide the conveyor chains and prevent lateral play thereof on the return runs of said chains. It is necessary to have said offsets 79 on the return runs because there are no sticks 75 between the brackets 72 to hold them properly spaced apart transversely of the machine. After the sticks 75 carrying the sausages 76 have traveled through the hot water, the conveyor chains again travel upwardly, thus providing a downwardly offset portion in the upper run of the conveyor chains at the cooking tank in order to immerse the sausages properly in the cooking water. The offset in said conveyor chains is obtained by means of the sprockets 50 and the sprockets 81 and 82 mounted on the shafts 83 and 84 respectively mounted in bearings 85 and 86 provided on the vertically extending members 10 at each end of said tank 24. The smoking sticks next pass into position under the cooling device comprising the tank 87 having a perforated bottom 88. Below said tank 87 is provided a tank 89 having inclined side walls and having an opening at the bottom thereof leading to the pipe 90. Adjacent said tank 87 is a similar tank 87' having a perforated bottom 88' and being provided with a tank 89' below the same, similar to the tank 89, said tank 89' emptying into a pipe 90' corresponding to the pipe 90. The space between the tanks 87 and 89 is closed at the sides of the device by means of the member 91. From the pipes 90 and 90' connecting pipes 92 and 92' lead into the pump 93 from which a pipe 94 extends upwardly to the pipe 95 and 95' having the downward extensions 96 and 96' from which water is discharged into the tanks 87 and 87'. Thus it will be seen that a circulating system of cooling water is provided which is sprayed over the sausages through the perforations in the bottoms 88 and 88' of said tanks 87 and 87' to cool the same as they pass along under said tanks due to movement of said conveyor chains 51. It is, of course, to be understood that the number of spraying tanks is immaterial and may be varied as convenience and necessity requires. After the sausages pass from under the cooling spray they are quite often of undesirable appearance due to the fact that the casing has become wrinkled or shriveled during the cooling operation. It has been found that by passing a spray of hot water over the sausages for a brief period of time the smooth appearance of the casing can be restored without warming up the sausages to any appreciable degree, the heating effect of the hot water only going inwardly a very slight distance beyond the casing. The means for supplying the sausages with hot water comprises a tank or receptacle 97 having a perforated bottom 98, said receptacle being located above the upper run of the conveyor beyond the cooling sprays. Said tank 97 is provided with a supply of hot water from the hot water supply pipe 99, and it will be seen from Fig. 2 that the hot water sprays from the tank 97 onto the sausages 76 below the same for a brief period of time as the tank is not of any very great extent longitudinally of the machine. The hot water that is sprayed from the bottom of said tank 97 is received in the receptacle 100 below said upper run of the conveyor which is provided with a drain pipe 101. After the sausages have passed under the hot water supply, the same are carried along a sufficient length of the conveyor before reaching the sprocket 52, so that the same are dry when they reach this point at which they are removed from the machine by lifting the smoke house sticks out of the sockets or U-shaped members in which the same ordinarily rest.

It will be seen that not only is a new and improved machine provided for cooking and otherwise treating sausages which is continuous and automatic in operation and which is adjustable in speed so as to adjust the length of time of cooking of the sausages but also a new and improved process of treating sausages is provided which comprises cooking, cooling and spraying said sausages with hot water after cooling the same to recondition said sausages. This process, as will be evident, can be carried on without the particular apparatus used or by hand and is not dependent on the particular machine described herein.

Due to the provision of the vertically movable framework carrying that portion of the sausage conveyor passing through the cooking vat and the device for holding the sausages immersed in the hot water, these devices can be readily elevated above the tank to permit cleaning of said devices and said tank, this being necessary as a large amount of scum and grease remains in the tank after the sausages have passed through.

In providing means for holding the sausages and the sausage casing sticks immersed in the water, it is necessary that the slats engage with an even pressure with said sausages, which pressure must be such as will not break the sausage casing. By providing the slats on the chains which operate over sprockets, which are on the same shaft with the sprockets over which the guide chains of the conveyor for carrying the sticks pass, the relative position of the slats and the sticks can be very nicely adjusted so that breaking of the sausage casing is prevented.

In cooking sausages in the ordinary way it takes a considerable length of time to fill the vat in which the cooking water is placed, and as a result some of the sausages are cooked a much longer period of time than others, and there is a great difference in the appearance and the uniformity of cooking of the sausages of each batch placed in the vat. In the machine comprising the present invention the sausages are all subjected to the hot water for the same length of time and the length of time during which said sausages are immersed in the hot water is dependent upon the speed of the conveyor which may be adjusted in accordance with the length of time it is desired to cook the sausages. However, for any one kind of sausages the cooking operation is the same and the speed of the conveyor is uniform, thus a uniform cooking of the sausages is obtained at all times, and as far as known the apparatus shown in the drawings is the only apparatus by means of which such uniform cooking has been accomplished.

Having thus described my invention, what I desire to claim and secure by U. S. Letters Patent is:

1. A device of the character described, comprising a cooking receptacle, means for conveying articles to be cooked through said receptacle, members for supporting said articles, said articles being suspended from said members, and means for holding said articles submerged in the cooking liquid in said receptacle while passing through the same, and in engagement with said supporting members.

2. A device of the character described comprising a cooking receptacle, a cool water spraying device, a hot water spraying device and a conveyor for passing sausages through said receptacle and under said spraying devices in succession.

3. A sausage treating device, comprising a cooking receptacle, a cool water spraying device, a hot water spraying device and a continuous sausage carrying conveyor operating at a constant speed passing through said receptacle and under said cooling and hot water spraying devices successively, whereby the relative proportion of time said sausages are cooked, cooled and sprayed with hot water is fixed.

4. A device of the character described comprising a cooking receptacle, a conveyor for sausages passing through the cooking liquid in said receptacle, and means for holding said sausages below the level of said liquid as they move through the same, said conveyor being bodily movable into and out of said receptacle.

5. A device of the character described comprising a cooking receptacle, a conveyor for sausages passing through the cooking liquid in said receptacle, and means for holding said sausages below the level of said liquid as they move through the same, said conveyor and said means being bodily movable into and out of said receptacle.

6. The method of treating cooked sausages, comprising spraying said sausages with hot water.

7. The method of treating sausages, comprising cooking the same, then cooling the same and then applying moist heat to the casings thereof.

8. The method of treating sausages, comprising applying moist heat to the casings thereof after said sausages have been cooked.

9. The method of treating sausages, comprising cooking the same, then cooling the same, then applying moist heat to the casings thereof and then drying the same.

10. The method of treating sausages comprising cooking the same, spraying the same with sufficient cold water to cool the same, and spraying the same with sufficient hot water to warm the casing without heating the interior of the sausage.

11. A device of the character described comprising a conveyor adapted to carry smoke-house sticks thereon, a cooking vat, said conveyor passing through the cooking liquid in said vat, and means above said conveyor for holding said sticks thereon while in said liquid.

12. A device of the character described comprising a conveyor adapted to carry sausage supporting smoke-house sticks thereon, a cooking vat, said conveyor passing through the liquid in said vat, and means above said conveyor for holding said sticks thereon while in said liquid and for retaining said sausages on said sticks.

13. A device of the character described, comprising a cooking receptacle, means for conveying articles to be cooked through said receptacle, members for supporting said articles, said articles being suspended from said members, and means for holding said articles submerged in the cooking liquid in said receptacle while passing through the same, said means clamping said articles to said members.

14. A device of the character described comprising a conveyor adapted to carry smoke-house sticks thereon, a cooking vat having cooking liquid therein, and a member moving with said conveyor for holding said sticks on said conveyor while in said liquid.

15. A device of the character described comprising a conveyor adapted to carry sausage supporting smoke-house sticks thereon, a cooking vat, said conveyor passing through the cooking liquid in said vat, and a member moving with said conveyor for holding said sausages on said sticks and said sticks on said conveyor while in said liquid.

16. A device of the character described comprising a conveyor adapted to carry smoke-house sticks thereon, a cooking vat, said conveyor passing through the cooking liquid in said vat, and an articulated belt-like member moving above said conveyor and holding said sticks on said conveyor while in said liquid.

17. A device of the character described comprising a conveyor adapted to carry sausage supporting smoke-house sticks thereon, a cooking vat, said conveyor passing through the cooking liquid in said vat, and an articulated belt-like member moving above said conveyor and holding said sausages on said sticks and said sticks on said conveyor while in said liquid.

18. A device of the character described, comprising a cooking receptacle, means for conveying articles to be cooked through said receptacle, members for supporting said articles, said articles being suspended from said members, and means for holding said articles submerged in the cooking liquid in said receptacle while passing through the same, said means holding said members in engagement with said conveying means.

19. A device of the character described comprising a cooking receptacle, a sausage carrying conveyor passing through the cooking liquid in said receptacle and a member above said conveyor and moving in the same direction as said conveyor for holding said sausages below the surface of said liquid as said sausages move through the same.

20. A device of the character described comprising a cooking receptacle, a sausage carrying conveyor passing through the cooking liquid in said receptacle, a member above said conveyor and moving in the same direction as said conveyor for holding said sausages below the surface of said liquid as said sausages move through the same and a driving connection between said conveyor and member for driving said conveyor and member at substantially the same linear speed.

21. A device of the character described comprising a cooking receptacle, a sausage carrying conveyor passing through the cooking liquid in said receptacle and a member above said conveyor for holding said sausages below the surface of said liquid as said sausages move through the same, said conveyor and said member being movable vertically into and out of said receptacle.

22. A device of the character described comprising a cooking receptacle, a sausage carrying conveyor passing through the cooking liquid in said receptacle and an articulated belt-like member above said conveyor for holding said sausages below the surface of said liquid as said sausages move through the same.

23. A device of the character described comprising a cooking receptacle, a sausage carrying conveyor passing through the cooking liquid in said receptacle and a linked member above said conveyor for holding said sausages below the surface of said liquid as said sausages move through the same.

24. A device of the character described comprising a cooking receptacle, a sausage carrying conveyor passing through the cooking liquid in said receptacle and a linked member having transverse strips above said conveyor for holding said sausages below the surface of said liquid as said sausages move through the same.

25. A device of the character described comprising a cooking receptacle and a sausage carrying conveyor passing through the cooking liquid in said receptacle, said conveyor comprising a pair of linked members having smoke-house stick receiving sockets therein.

26. A device of the character described comprising a cooking receptacle and a sausage carrying conveyor passing through the cooking liquid in said receptacle, said conveyor comprising a pair of chains comprising links having laterally extending smokehouse stick receiving sockets therein.

27. A device of the character described comprising a cooking receptacle and a sausage carrying conveyor passing through the cooking liquid in said receptacle, said conveyor comprising a pair of chains comprising links having laterally extending brackets offset therefrom and smoke-house stick receiving members on said brackets.

28. A device of the character described, comprising a fixed framework, a movable framework, a cooking vat in alignment with said movable framework, a conveyor having a portion mounted on said fixed framework and a portion on said movable framework, means for moving said movable framework vertically and means for normally supporting said movable framework in such a position that the portion of the conveyor mounted thereon is depressed below the surface of the liquid in said vat.

29. A device of the character described, comprising a fixed framework, a movable framework, a cooking vat in alignment with said movable framework, a conveyor having a portion mounted on said fixed framework and a portion on said movable framework, a member for holding smoke-house sticks on said conveyor mounted on said movable framework means for moving said movable framework vertically and means for normally supporting said movable framework in such a position that the portion of the conveyor mounted thereon and said member are depressed below the surface of the liquid in said vat.

30. A device of the character described, comprising a fixed framework, a movable framework, a cooking vat in alignment with said movable framework, a conveyor having a portion mounted on said fixed framework, and a portion on said movable framework, means for moving said movable framework vertically, means for normally supporting said movable framework in such a position that the portion of the conveyor mounted thereon is depressed below the surface of the liquid in said vat, and means for holding said framework in elevated position above said vat.

31. A device of the character described, comprising a fixed framework, a movable framework, a cooking vat in alignment with said movable framework, a conveyor having a portion mounted on said fixed framework and a portion on said movable framework, a member for holding smoke-house sticks on said conveyor mounted on said movable framework, means for moving said framework vertically, means for normally supporting said movable framework in such a position that the portion of the conveyor mounted thereon and said member are depressed below the surface of the liquid in said vat and means for holding said framework in elevated position above said vat.

32. A device of the character described, comprising a framework, a cooking vat mounted thereon, a cold water spraying device on said framework adjacent said vat, a hot water spraying device on said framework adjacent said cold water spraying device and means for conveying sausages through said vat from said vat to said cold water spraying device and from said cold water spraying device to said hot water spraying device.

33. A device of the character described, comprising a framework, a cooking vat mounted thereon, a cold water spraying device on said framework adjacent said vat, a hot water spraying device on said framework adjacent said cold water spraying device and means for conveying sausages through said vat from said vat to said cold water spraying device and from said cold water spraying device to said hot water spraying device, the extent of said hot water spraying device lengthwise of said conveying means being small in proportion to the extent of said cold water spraying device.

34. A device of the character described, comprising a framework, a cooking vat mounted thereon, a conveyor passing through said vat, means for subjecting sausages on said conveyor to a cooling spray for a predetermined interval and means for subjecting sausages on said conveyor to a hot water spray for a relatively brief interval.

35. A device of the character described comprising a conveyor adapted to carry smoke-house sticks thereon, a cooking vat having cooking liquid therein, and a member for moving with said conveyor for holding said sticks on said conveyor while in said liquid, said conveyor and said member operating over sprockets on common shafts.

In witness whereof I hereunto subscribe my name this sixth day of January, A. D. 1923.

HAROLD O. HAGUE.